July 14, 1936.  L. HARVEY  2,047,556
BRAKE MECHANISM
Filed Aug. 23, 1932   3 Sheets-Sheet 1

Lee Harvey,
Inventor

By (signature)
Attorney

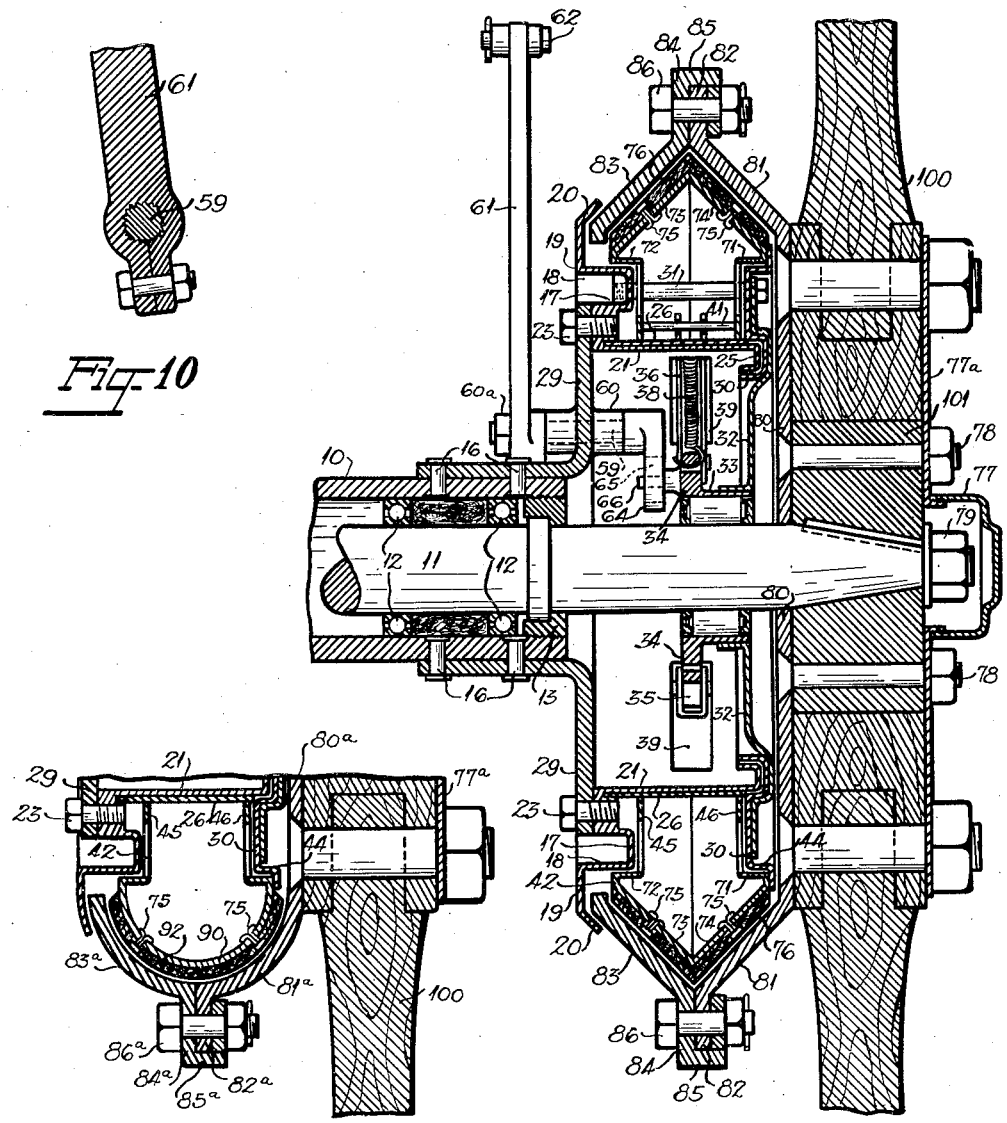

July 14, 1936.  L. HARVEY  2,047,556
BRAKE MECHANISM
Filed Aug. 23, 1932  3 Sheets-Sheet 3
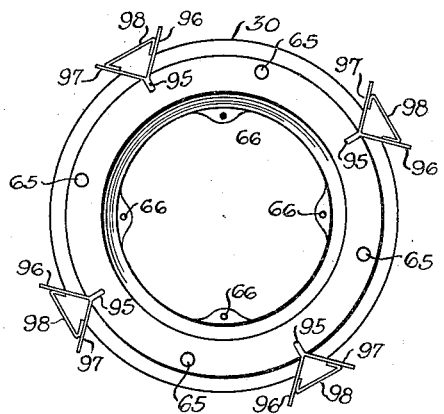
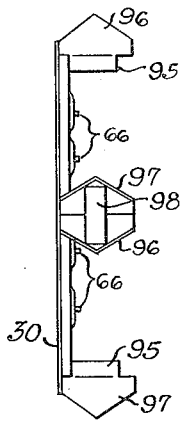
Fig. 3  Fig. 4
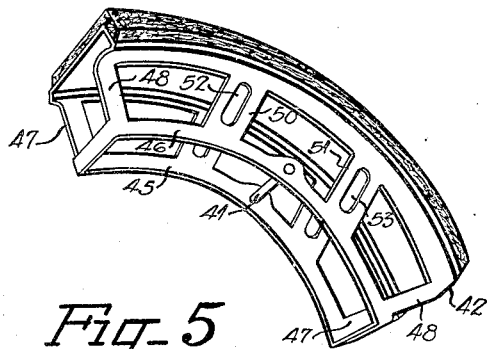
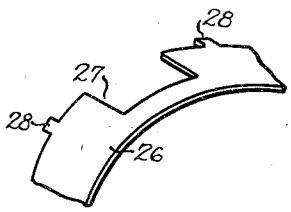
Fig. 5  Fig. 9
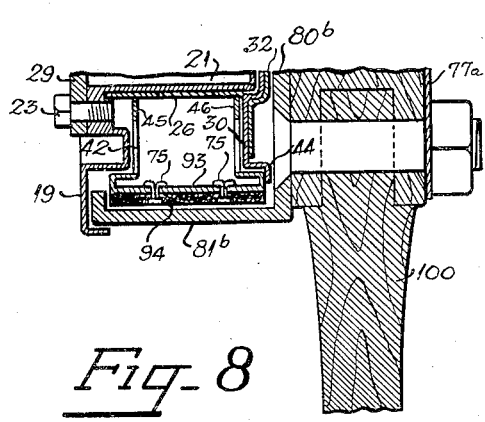
Fig. 8
Inventor,
Lee Harvey
By Paul B. Eaton
Attorney Patented July 14, 1936

2,047,556

UNITED STATES PATENT OFFICE 2,047,556

BRAKE MECHANISM

Lee Harvey, Greensboro, N. C., assignor of twenty-six per cent to Radiator Specialty Company, Charlotte, N. C., a corporation of North Carolina, and twenty-five per cent to Paul B. Eaton, Charlotte, N. C.

Application August 23, 1932, Serial No. 630,011

5 Claims. (Cl. 188—78)

This invention relates to an improved brake and more especially to a brake adapted to be associated with automotive vehicles and the like such as the wheels of automobiles and is so designed as to be especially adapted for the new type of air wheels as the space occupied by the brake for the required amount of braking power is small in comparison with other well known types of brakes. The brake is so designed and constructed as to be especially adaptable for use with any type of wheel, as the brake is adapted to be secured onto the side of any wheel so it is evident that various forms of construction can be used by adopting the braking apparatus to the peculiar type of wheel with which it is desired to be employed.

An object of this invention is to provide a brake in which the braking apparatus is efficient under all conditions and in which the parts thereof are so designed as to make it possible to use a pressure receiving surface sometimes called a brake drum which can be made of a low grade of iron which has been for some time and is now regarded as the ideal braking surface, because it will not become glazed and slick and lose its efficiency as a braking surface under wear, but heretofore it has been necessary to use either a high grade steel or some metallic substance having a relatively low carbon content therein, because it has been necessary to draw, stamp, spin or otherwise form the brake drum.

As brake drums have heretofore been bent at sharp angles of approximately 90 degrees it has been impossible to manufacture brakes having the pressure receiving drum composed of a low grade of iron on account of the fact that the design of the brakes would not permit such use of a steel or iron having a high carbon content.

A still further object of this invention is to provide a brake adapted to be associated with any type of automotive wheel or any braking apparatus such as pulleys and the like, in which a plurality of brake shoes are provided which are skeleton in formation and, therefore, self-cooling and which are associated with means whereby these brake shoes are expanded simultaneously to an equal degree against the internal surface of a brake drum with the brake applying means being so constructed as to prevent the brake operating means from passing dead center and thus locking the wheels, and in this manner a brake structure is provided which is efficient at all times and which can be repaired or adjusted without the necessity of dismantling the brake for the purpose of either relining the brakes or roughening the braking surfaces on account of the peculiar structure of the brakes and on account of the use of a soft iron pressure receiving surface against which the brake shoes are expanded outwardly in what is known as internal expansion brakes.

A still further object of this invention is to provide a brake adapted to be associated with automotive vehicles and other rotating devices in which the brake is carried by the axle housing and does not revolve with the wheel, and the braking apparatus thus remains stationary and is not therefore affected by centrifugal force as is the case in some brakes which are built in or associated with the wheels themselves.

In wheel structures wherein the brakes are formed with the wheel structure and in which the pressure receiving areas against which the brake shoes are applied form a part of the wheel itself, it is seen that a high grade of steel is required to be used for the stamping operation in forming the wheel with the brake drum made a part thereof, and on account of this high grade of steel being used the wearing surface against which the shoes are expanded soon becomes glazed and slick on account of having a too low carbon content therein which, of course, is necessary in order for the wheel and the braking surface to be stamped into the proper form.

Some of the objects of the invention having been stated, the invention will appear more fully when hereinafter explained when taken in connection with the accompanying drawings, in which—

Figure 2 is a sectional view taken along line 2—2 in Figure 1;

Figure 3 is a side elevation of the dividing member for holding the segmental shoes in position and guiding them radially;

Figure 4 is an edge elevation of Figure 3;

Figure 5 is a perspective view of one of the brake shoes;

Figure 7 is a modified form showing a brake shoe having a semi-circular braking surface in cross section and a suitable brake drum to fit the shoe;

Figure 8 is a modified form showing a brake for receiving a conventional flat brake band;

Figure 9 is a perspective view of a portion of the wear compensating shim;

Figure 10 is a sectional view thru the brake operating lever and the shaft on which it is mounted.

Figures 1, 6:
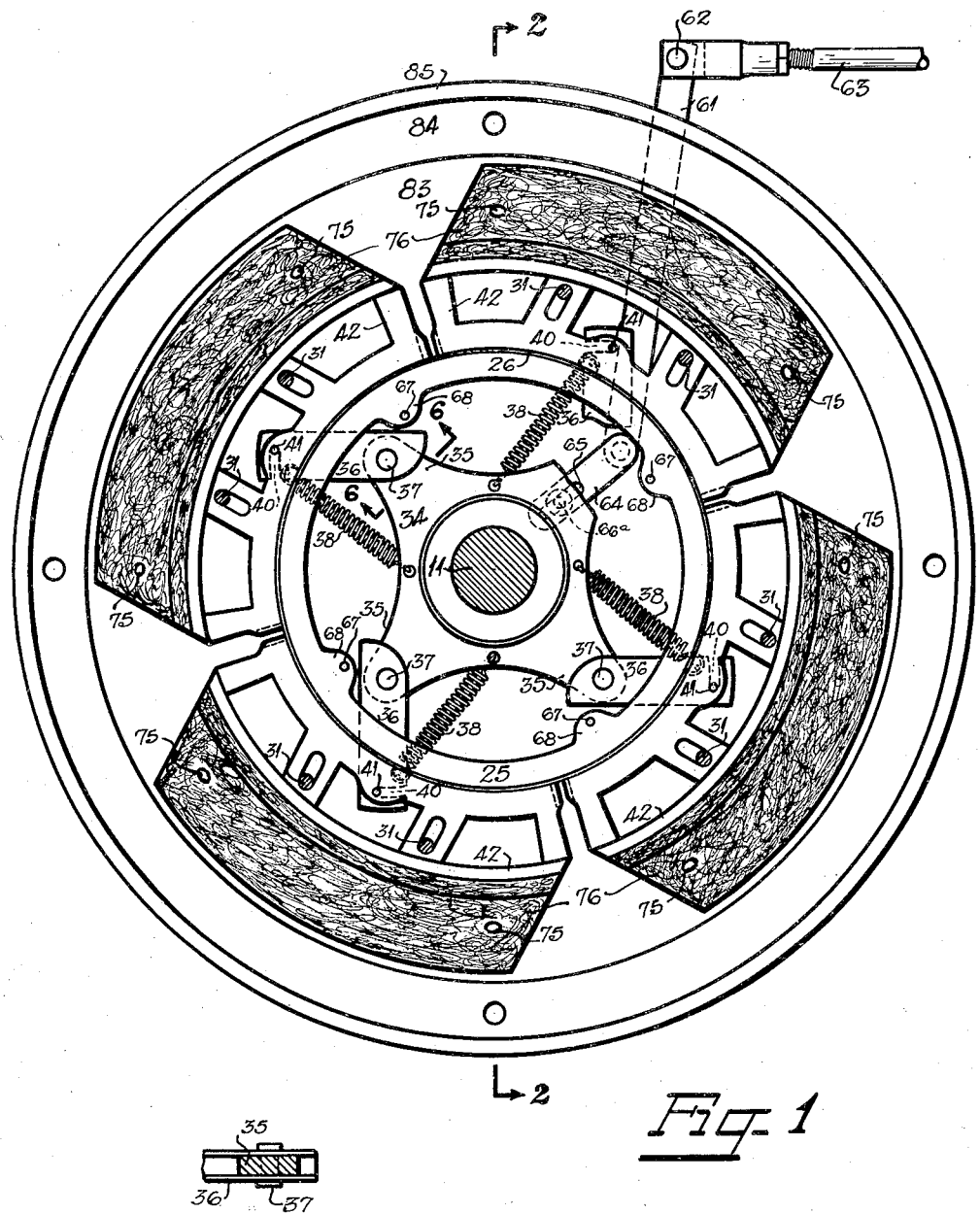
Figure 1 is an elevation of the brakes with the wheel and the portion of the brake drum attached to the wheel being removed.
Figure 6 is a sectional view taken along line 6—6 in Figure 1.

Referring more specifically to the drawings, numeral 10 indicates the axle housing in an automobile with axle 11 mounted therein by any suitable means such as roller bearing 12, said roller bearing being secured in the axle housing by any suitable means such as a nut 13. Mounted around axle housing 10 is the main supporting disc of the brake mechanism whose tubular portion 15 encircles axle housing 10 and secured thereto by any suitable means such as a plurality of rivets 16. This supporting member has a vertically disposed disk-like portion 29 which has secured thereto by any suitable means such as bolt 23 an inwardly projecting circular portion 17 formed by a circular ring 18 and the outer surface forms guiding circular surface 19 for the plurality of brake shoes to be hereinafter described. This member 17 has an inturned flange 20 along the periphery thereof which projects toward the wheel with which this apparatus is adapted to be associated. The member 17 has a ring like or circular portion 21, said ring like portion being turned inwardly and reversed backwardly as at 25.

A suitable guide plate 30 is secured against portion 25 by means of bolts 31 passing thru plates 17 and 30, the plate 30 having a shoulder portion 44 similar to shoulder portion 19 which forms a guideway for the other side of the brake shoes to be hereinafter described. Bolts 31 also penetrate a plate 32 made to conform to the contour of plate 30 which, near its central portion, has a hole into which is adapted to fit a hub portion 33 of a spider member 34 having a plurality of projections 35 to which are pivotally secured for limited movement links 36 by any suitable means such as rivets 37 and it will be seen that these links 36 are U shaped in cross section so that when the end nearest the axle 11 engages the projection 35 that it will prevent the links 36 from having their outer ends moved past a dead center and thus locking of the brakes will be prevented.

Near the outer ends of each of the members 36 is secured a tension spring 38 which has the other end secured to the spider to normally press the parts to the position shown in Figure 1. The outer end of links 36 passes thru perforations 39 and notches 27 in circular shim 26 and is hooked as at 40 to engage a pin 41 penetrating segmental brake shoe 42 which shoe 42 is skeleton in formation and its outer surface is V shaped and is equipped with a suitable brake lining 76.

In order to compensate for wear which may take place in the brake lining on the shoes, I provide a circular shim 26 having four notches 27 therein which is adapted to be slipped in the right hand side of Figure 2 when the wheel and plates 30 and 32 are removed to fit between the portions 45 and 46 of the shoes and circular portion 21, the notches 27 being provided to allow movement of arms 36 therein. It is evident that this circular shim 26 may be inserted to compensate for wear in brake shoes 76. This shim is made so as to form a tight fit over circular portion 21 but if desired it may have lugs 28 which may pierce suitable holes in member 17 to prevent turning thereof in case it should have a tendency to turn from vibration. The shim may be of any desired thickness to be renewed from time to time to compensate for wear in the brake linings on the shoes.

Each of the brake shoes has curved inner portions indicated by 45 and 46 which are adapted to rest on the portion 21 or shim 26 and portion 44 (see Fig. 2) when in retracted or inoperative position due to the tension of springs 38. These brake shoes have ribs 47 and 48 at each end thereof joining the brake lining receiving area with the portions 45 and 46, and also joining said portions are the portions 50 and 51 having therein parallel slots 52 and 53 which are adapted to loosely receive bolts 31, the pins 31 forming a portion of the guiding means for said brake shoes.

Mounted in bearing 60 in disk 29 is a shaft 59 which is serrated on its outer end and has secured thereon by any suitable means such as a nut 60a a brake operating lever 61 having a serrated hole therethrough for reception of shaft 59. Said lever 61 has secured at the upper end thereof as at 62 a brake operating mechanism 63 which may be connected to manual operating means or if desired, to hydraulic operating means for operating the same.

Shaft 59 which projects thru bearing 60 has an arm 64 integral therewith which is slotted as at 65 and receives pin 66a secured in spider member 34 so that it is seen that by operation of brake lever 61 spider 34 will be rotated on bearing disposed on axle 10 and each of links 36 will direct each of the brake shoes 42 outwardly against the brake drum structure to be presently described.

Plate 30 has a plurality of holes 65 therein which are penetrated by bolts 31, said plate 30 having a plurality of projections 66 thereon which are adapted to project into holes 67 in lugs 68 on portion 25. This prevents relative movement between plate 30 and portion 25 which is integral with portion 21 which, in turn, is secured to plate 29.

Plate 30 has disposed around the periphery thereof and projecting inwardly from the inside portion of plate 30 a plurality of Y shaped members comprising a radial portion 95 and portions 96 and 97 with a top bracing portion 98. The portions 96 of one member being parallel with portions 97 of the next succeeding member so as to form a guideway and support for the ends of the segmental brake shoes so as to cause the brake shoes when expanded by rotation of the spider member to move radially outward and to prevent either end of the brake shoe from receiving more than its share of pressure as applied against the brake drum and this in association with the slots 52 and 53, cooperating with pins 31, causes all portions of each brake shoe to receive an equal amount of pressure and makes it absolutely impossible for one end of the brake shoe to be picked up or drawn outward by rotation of the brake drum as occurs in many instances where this feature is not properly taken care of.

Each of the brake shoes have outwardly flared portions indicated by 71 and 72, these portions 71 and 72 serving as a support for the shoes when in inoperative position. Integral with portions 71 and 72 are the converging portions 73 and 74 to which are secured in any suitable manner, such as by rivets 75, brake lining 76. A suitable wheel such as an automobile wheel indicated by reference character 100 has a bearing portion 76 adapted to fit on the end of axle 11, and is secured thereon by any suitable means such as a nut 79. A suitable hub cap 77 is secured onto plate 77a which is held in position by means of bolts 78.

Bolts 78 penetrate plates 80 and 77a and wheel 75 and bearing 101. Plate 80 has a portion 81 integral therewith and disposed at approximately 45 degrees from the plane of plate 80 which projects inwardly over the brake mechanism described and has a flange 82 and occupies a plane parallel to the main portion of plate 80. A second half of the brake shoe is an annular member 83 which has portions 84 parallel to portion 82 and a portion 85 projecting over the end of portion 82. Suitable bolts 86 penetrate portions 82 and 84 to secure portions 81 and 83 together to form a brake drum, V shaped in cross section, for receiving pressure from the brake lining 76 disposed on shoes 42.

Particular attention is called to the fact that due to the shape of portions 81 and 83 that it is possible to use a low grade of iron on account of the fact that portion 81 is not bent to a sharp angle with relation to portion 80, and where portion 81 is approximately at right angles to portion 80, then in the drawing or stamping operation or whatever operation may be resorted to for the production of the brake drum, it is necessary to have a lower carbon content in the iron than is necessary in forming the product as shown in Figure 2, and as a result the low grade of iron produces a very desirable braking surface which will not become glazed and ineffective after being used and will not chatter.

In Figure 7 a slightly modified form of the invention is shown in which the parts are identical except plate 80a, which corresponds to plate 80 in Figure 2 has a portion 81a, corresponding to portion 81 of Figure 2, in the form of a quarter of a circle with portion 82a corresponding to portion 82 in Figure 2, and portion 83a corresponding to portion 83 in Figure 2 being in the form of another quarter circle having portion 84a corresponding to portion 84 in Figure 2, and also having portion 85a corresponding to portion 85 in Figure 2, with bolts 86a fastening the parts together and corresponding to bolts 86 in Figure 2. To conform to this type of brake drum the outer surfaces of the brake shoes 42a have semi-circular surfaces 90 having a semi-circular brake lining 92 thereon to fit the portions 83a and 81a, but in all other respects the two brake structures are identical and bear similar reference characters. It is also to be pointed out that the structure shown in Figure 7 can also be made of grey iron or a low grade of iron on account of the fact that the surfaces are not sharply drawn or stamped and, therefore, a low grade of iron is capable of being used.

In Figure 8 another modified form of the invention is shown in which the plate 80b corresponds to plate 80 in Figure 2 but has the portion 81b disposed at right angles to plate 80b forming the brake drum, and the brake shoes have the flat surface 93 on which the conventional flat brake lining 94 is placed and all other parts of the structure are identical and similar reference characters applied. This form shown in Figure 8 is not as desirable as in the other form because by using this form of brake drum, which is conventional as far as the drum is concerned, it is necessary to use a higher grade of steel which has the disadvantages above recited, but the other mechanism as above described is capable of being used in connection with this type of brake drum and greatly increased results over present day type of brakes can be obtained by use of the brake mechanism above described even when used in connection with this type of brake drum.

I claim:
1. A brake for automobile wheels comprising a substantially circular plate member having means for securing the same to the axle housing, a spider member rotatably mounted on the axle of the automobile, a plurality of arc-shaped brake shoes, means connecting said spider and said shoes for expanding the shoes when the spider member is rotated, means on the exterior of said plate member and penetrating said plate member and having connection with said spider member for rotating said spider member, fixed means in sliding contact with the ends of the shoes for guiding the shoes radially outward a wheel secured on the outer end of the axle and having a brake drum secured thereto provided with a peripheral wearing surface V shaped in cross section adapted to receive pressure from said shoes, said brake drum and wheel being removable from the axle and from over the brake mechanism.

2. A brake mechanism for automotive vehicle wheels comprising an axle housing having an axle extending from the end thereof, a brake supporting mechanism secured on said axle housing, a plurality of arc-shaped brake shoes supported by said brake supporting mechanism, said shoes having a wearing surface which is V shaped in cross section, a spider member surrounding the axle, links pivotally connected at one end to the spider member and extending from the spider member to the brake shoes, means for preventing said links from passing a dead center, operating means for said spider member extending thru said brake supporting mechanism, a wheel secured on the end of the axle and having a brake drum secured thereto said brake drum being bent at an oblique angle with relation to the wheel to form a wearing surface for one of the side portions of the shoes, a circular member secured to the periphery of said brake drum and having a wearing surface disposed at an oblique angle with relation to the axle and forming a wearing surface for the other side of said shoes.

3. In a brake mechanism for automobile wheels and the like, a disk fixedly mounted on the axle housing of the automobile, a plurality of expansible brake shoes supported by said disk, a spider member loosely mounted on the axle of the automobile, actuating means mounted in said disk and having connection with said spider member, fixed means in sliding contact with the ends of the shoes for guiding said shoes radially outward from the center of said axle when expanded by movement of said spider, a brake drum secured to the wheel of the automobile and having a wearing surface disposed obliquely with relation to the plane of the wheel, an annular wearing member secured to the periphery of the brake drum and having a wearing surface disposed at an oblique angle with relation to the plane of the wheel, the annular member and the peripheral portion of the brake drum forming a V shaped inwardly opening groove and the outer surface of said shoes having a surface adapted to fit into said V shaped groove.

4. Brake mechanism for wheels of automobiles comprising a disk secured to the axle housing of the automobile, an annular member secured to the periphery of the disk, a second disk secured to the annular member and in spaced relation thereto, a second annular member secured to said second disk, common means extending from the first annular member for supporting the said second disk and said second annular member, the two annular members having circumferential shoulders, a plurality of brake shoes normally resting on said shoulders, said shoes having slots therein penetrated by the said common means, the second annular member having means extending between the ends of the shoes for guiding the same radially outward, and a pressure receiving member secured to the wheel and against which the shoes are adapted to be pressed.

5. Brake mechanism for automobile wheels having a plurality of brake shoes and means for moving the shoes radially outward with relation to the wheel, said shoes being of skeleton formation and having parallel spaced side portions and said side portions having parallel slots therein and means slidingly penetrating said slots for supporting said shoes for radial movement, and fixed abutments having fixed parallel surfaces against which the ends of the shoes have sliding contact at all times as they move radially outwardly and inwardly.

LEE HARVEY.